Aug. 9, 1927.
H. SANDOZ
1,638,366
MICROMETER
Filed March 19, 1924
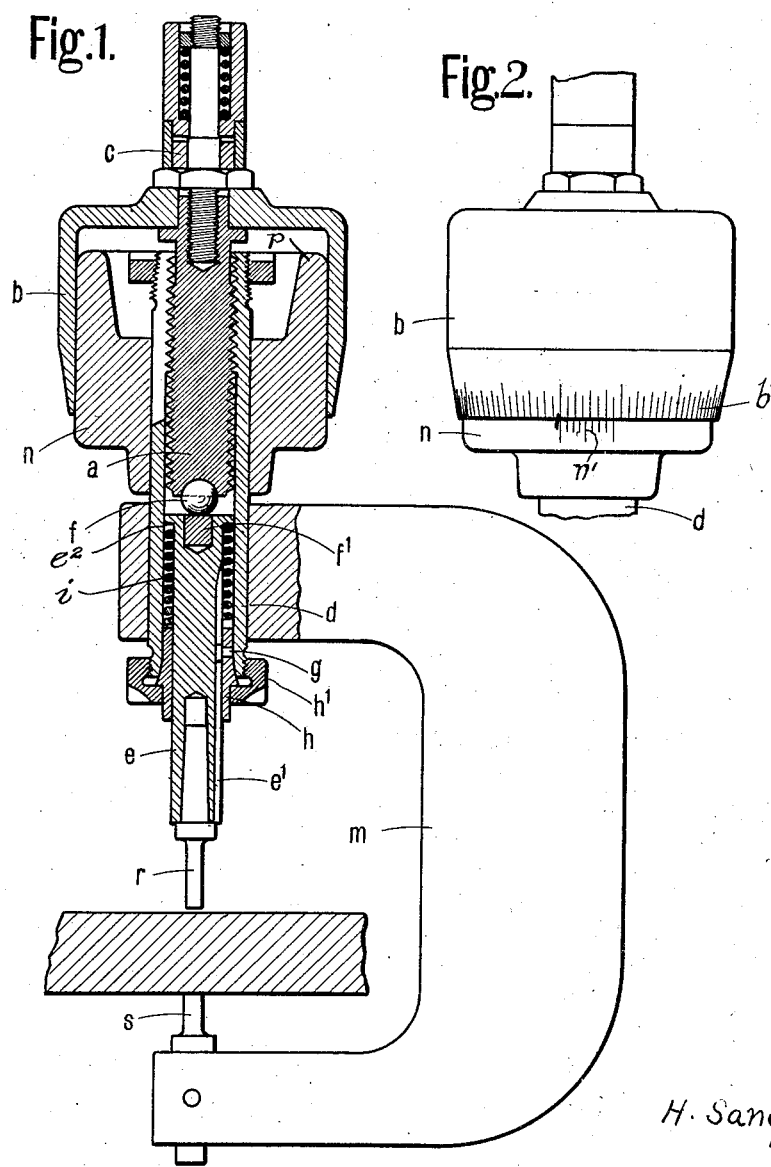
H. Sandoz
inventor Patented Aug. 9, 1927.

1,638,366

UNITED STATES PATENT OFFICE.

HENRY SANDOZ, OF TAVANNES, SWITZERLAND.

MICROMETER.

Application filed March 19, 1924, Serial No. 700,350, and in Switzerland February 11, 1924.

The present invention relates to a micrometer gauge adapted to measure the thickness of objects between a stationary and a movable jaw.

The object of the present invention is to render the working of the instrument as frictionless and as sensitive as possible.

In the annexed drawing Fig. 1 represents a side-elevation of the gauge the operative parts of the movable jaw being shown in section and Fig. 2 is a part of a side elevation showing the graduation of the instrument.

In the drawing it is supposed that the sleeve $d$ which carries the operative parts of the movable jaw $r$ is held by one arm of a bracket $m$ the other arm of which carries the fixed jaw $s$ opposite to the first. Said operative parts include an adjustable drum $b$ which is marked with a vernier scale $b'$ registering with graduations $n'$ on the stationary head $n$ rigidly fast to said sleeve. The drum $b$ is sleeved on a neck $p$ of the micrometer screw $a$ and adapted to operate this screw through the intermediary of a device $c$. This device stops the drum as soon as the contact pressure exerted by the jaw upon the object to be measured has reached a certain limit. Such a device secures an uniform measuring and, as it is well known, it is not described here any further. The device $c$ is joined to the micrometer screw $a$ which is longitudinally adjustable within sleeve $d$ by means of internal threads. The micrometer screw bears on the holder $e$ of the movable jaw $r$ which fits into a conical lodging of the holder $e$. Holder $e$ is held slidably within the sleeve $d$ by means of a spring $i$ inserted between a shoulder $e^2$ of the holder and a guiding ring $h$ which is held fast by means of a conical part at the lower end of sleeve $d$ by a nut $h^1$ and a stud $g$ fixed to said ring and engaged into a slot $e^1$ of holder $e$ prevents the latter from turning. The spring $i$ maintains the constant contact between the holder and the micrometer screw, which contact is rendered as frictionless as possible by means of an interposed ball $f$. This ball is held in a hemispheric hollow provided at the end of the micrometer screw and rests on the flat surface of a hardened steel plug $f^1$ of the holder.

If screw $a$ is turned holder $e$ will not be turned but only be displaced in an axial sense.

What I claim as new is:

In a micrometer gauge having a stationary and a movable jaw, in combination, a bracket, an internally threaded sleeve held fast thereby, a micrometer screw threaded in said sleeve, a graduated drum fixed to said screw, a jaw holder carrying said movable jaw and provided with a shoulder, said holder being fitted slidably into said sleeve, a ball interposed between the jaw holder and the micrometer screw and a pressure spring bearing on the shoulder of the jaw holder and capable of maintaining the contact between said ball and the jaw holder.

In testimony whereof I affix my signature.

HENRY SANDOZ.